United States Patent
Dent

(10) Patent No.: US 8,369,459 B2
(45) Date of Patent: Feb. 5, 2013

(54) DIVERSITY RECEIVERS AND METHODS FOR RELATIVELY-DELAYED SIGNALS

(75) Inventor: Paul Wilkinson Dent, Pittsboro, NC (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 782 days.

(21) Appl. No.: 12/415,094

(22) Filed: Mar. 31, 2009

(65) Prior Publication Data

US 2010/0248664 A1    Sep. 30, 2010

(51) Int. Cl.
*H04L 27/06* (2006.01)
(52) U.S. Cl. ......................................................... 375/340
(58) Field of Classification Search .................. 375/324, 375/340, 341, 229, 232
See application file for complete search history.

(56) References Cited

U.S. PATENT DOCUMENTS

| | | | |
|---|---|---|---|
| 5,099,499 | A | 3/1992 | Hammar |
| 6,185,259 | B1 | 2/2001 | Dent |
| 6,658,071 | B1 | 12/2003 | Cheng |
| 6,711,218 | B2 | 3/2004 | Dent |
| 6,765,969 | B1 | 7/2004 | Vook et al. |
| 6,819,630 | B1 | 11/2004 | Blackmon et al. |
| 7,003,055 | B2 | 2/2006 | Sexton et al. |
| 7,012,957 | B2 | 3/2006 | Allpress et al. |
| 7,103,112 | B2 | 9/2006 | Webster et al. |
| 7,151,796 | B2 | 12/2006 | Allpress et al. |
| 7,170,438 | B2 | 1/2007 | Jaussi et al. |
| 7,298,799 | B1 * | 11/2007 | Venkatesh et al. ............ 375/343 |
| 2006/0182195 | A1 | 8/2006 | Miller |
| 2006/0182210 | A1 | 8/2006 | Miller |
| 2006/0291595 | A1 | 12/2006 | Bachu et al. |

FOREIGN PATENT DOCUMENTS

| | | |
|---|---|---|
| EP | 1 427 159 A2 | 6/2004 |
| WO | 91/08620 A1 | 6/1991 |
| WO | 96/26578 A1 | 8/1996 |
| WO | 00/41507 A2 | 7/2000 |
| WO | 2006/041500 A1 | 4/2006 |

OTHER PUBLICATIONS

Tüchler, M, et al, "Turbo Equalization: Principles and New Results," IEEE Transactions on Communications, vol. 50, pp. 754-767, May 2002.

* cited by examiner

*Primary Examiner* — Jaison Joseph
(74) *Attorney, Agent, or Firm* — Potomac Patent Group PLLC

(57) ABSTRACT

Methods, software and apparatuses for decoding received delayed path signals are described. A receiver receives a signal via different paths with relative delay, e.g., on the same frequency channel. The signal is sampled at at least one sample per symbol. A channel estimator determines channel coefficients associated with the channel over which the signals were transmitted. A processor selects samples that include a dependence on a particular symbol being decoded and computes an error metric for each possible value of the particular symbol, for combinations of hypothesized future symbol values on which the selected samples depend, and for single values of previous symbols on which the selected samples depend. Error metrics calculated for each symbol are stored in memory. A soft symbol is generated based on said signal samples from the sampler, the channel coefficients and estimates of symbols computed.

28 Claims, 7 Drawing Sheets

DIVERSITY RECEIVERS AND METHODS FOR RELATIVELY-DELAYED SIGNALS

TECHNICAL FIELD

The present disclosure relates to communications systems in which, for example, two (or more) transmitters transmit the same information to a receiver over respective paths with a large differential delay, or in which one transmitted signal is received via two paths with a large differential delay between the two paths. The receiver receives the two (or more) signals and attempts to decode those signals in an optimum way, e.g., to achieve path diversity gains.

BACKGROUND

During the last few decades, interest in radio technologies for providing services for voice, video, data and the like has surged. Cellular communications service, for example, has provided voice and text messaging services to many millions of people worldwide. Satellite radio services have also introduced radio communications to areas which are not well served by cellular operators and also provide large scale broadcast service even to areas that are well covered by cellular networks, e.g., as provided by companies such as Sirius and XM.

When radio signals are transmitted over an air interface via a radio channel toward one or more receivers, e.g., by a cellular base station or a satellite, those radio signals are affected by the characteristics of that channel. Some sort of correction process, or a number of correction processes, can be applied to ensure, or attempt to ensure, that the signal which is received is decoded to recover the information that was actually transmitted. Broadcast radio presents a particular challenge in this regard because some of the processes which are typically used in cellular systems to correct erroneously received signals, e.g., retransmission based on feedback from the receiver, are not easily adapted to broadcast systems wherein any number of receivers in any number of locations may tune in and out of particular broadcasts somewhat rapidly. Accordingly, diversity reception, wherein a receiver uses information from multiple radio paths to reconstruct a transmitted signal, can be used to aid in error correction in such systems.

An equalization process is also commonly performed to offset the effects of the channel as part of the decoding process of the received signal(s). When a signal is received in a diversity receiver via two paths of relative delay L symbols, an equalizer using the Viterbi Maximum Likelihood Sequence Estimation (MLSE) procedure is an optimum decoder, but the complexity of the procedure is the order of $M^L$, where M is the size of the symbol alphabet. This complexity is excessive when the relative path delay L is a large number of symbols, in the sense that the equalization process consumes too much of the processing bandwidth which is available to the receiver when the relative delay L is a large number of symbols. Since the receivers in, for example, satellite radio systems, are essentially at unknown locations relative to their respective transmitters, it is not possible to synchronize the reception of the various radio paths which they receive and, accordingly, it is possible for such receivers to experience relative path delays L on the order of, e.g., +/−5 msec or thousands of symbol periods, which renders MLSE equalizers prohibitively computationally expensive.

A form of equalizer known as a decimating equalizer can alternatively be used, wherein signal samples i, i+L, i+2L, i+3L etc are processed by an instance i of the MLSE equalizer to decode symbols i, i+L, i+2L and so forth. Using L such equalizers, each processing 1/Lth of the samples, a receiver can thus decode all symbols. The complexity of the decimating equalizer is only of the order of M per decoded symbol, which is much lower than $M^L$. However, the decimating equalizer only works when the relative path delay is close to an integer number L of symbol periods.

There is therefore a need for a receiver equalizer that can decode signals when the second path is delayed by, for example, a large, non-integer number of symbol periods.

SUMMARY

According to one exemplary embodiment, a receiver for processing a signal modulated with data symbols and received via a plurality of paths having a relative delay therebetween includes a sampler for sampling the signal to obtain at least one sample per data symbol time interval, a channel estimator for determining a set of complex channel coefficients that characterize the delayed paths, a metric computer for computing an estimate of a current symbol and an associated metric, wherein the current symbol estimate and the associated metric are based on signal samples from the sampler, the channel coefficients from the channel estimator, estimates of previously estimated symbols, and hypotheses of not yet estimated symbols, and for storing the current symbol estimates and the associated metrics associated with combinations of the hypothesized symbols in a metric table for the current symbol, and a soft symbol value generator for generating a soft symbol value for a symbol based on the signal samples from the sampler, the channel coefficients from the channel estimator and estimates of symbols computed by the metric computer.

According to another exemplary embodiment, a method for processing a signal modulated with data symbols and received through a plurality of paths includes the steps of: sampling the signal to obtain at least one sample per data symbol time interval, determining a set of complex channel coefficients that characterize the delayed paths, computing an estimate of a current symbol and an associated metric, wherein the current symbol estimate and the associated metric are based on the sampling of the signal, the determining of the of complex channel coefficients, estimates of previously estimated symbols, and hypotheses of not yet estimated symbols, storing the current computed symbol estimates and the associated metrics for combinations of the hypothesized symbols in a metric table for the current symbol, and generating a soft symbol value for a symbol based on the sampled signal, the determined set of channel coefficients and computed estimates of symbols.

According to still another exemplary embodiment, a method for performing equalization in a diversity receiver includes the steps of receiving an information signal along at least two different paths, one path having a time delay L relative to the other path, wherein the time delay L is a non-integer number of symbol periods, and a value of L is greater than 25 symbol periods, and generating a soft symbol value for a symbol in the information signal based on samples from the information signal, channel coefficients associated with the information signal and stored estimates associated with other symbols in the information signal, wherein a computational complexity associated with the step of generating is on the order of M, where M is a size of a symbol alphabet associated with the information signal.

BRIEF DESCRIPTION OF THE DRAWINGS

The features, nature, and advantages of the present embodiments may become more apparent from the detailed description set forth below when taken in conjunction with the drawings in which like reference characters identify correspondingly throughout and wherein.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims.

Reference throughout the specification to "one embodiment" or "an embodiment" means that a particular feature, structure, or characteristic described in connection with an embodiment is included in at least one embodiment of the present invention. Thus, the appearances of the phrases "in one embodiment" or "in an embodiment" in various places throughout the specification are not necessarily all referring to the same embodiment. Further, the particular features, structures or characteristics may be combined in any suitable manner in one or more embodiments.

Figure 1A:
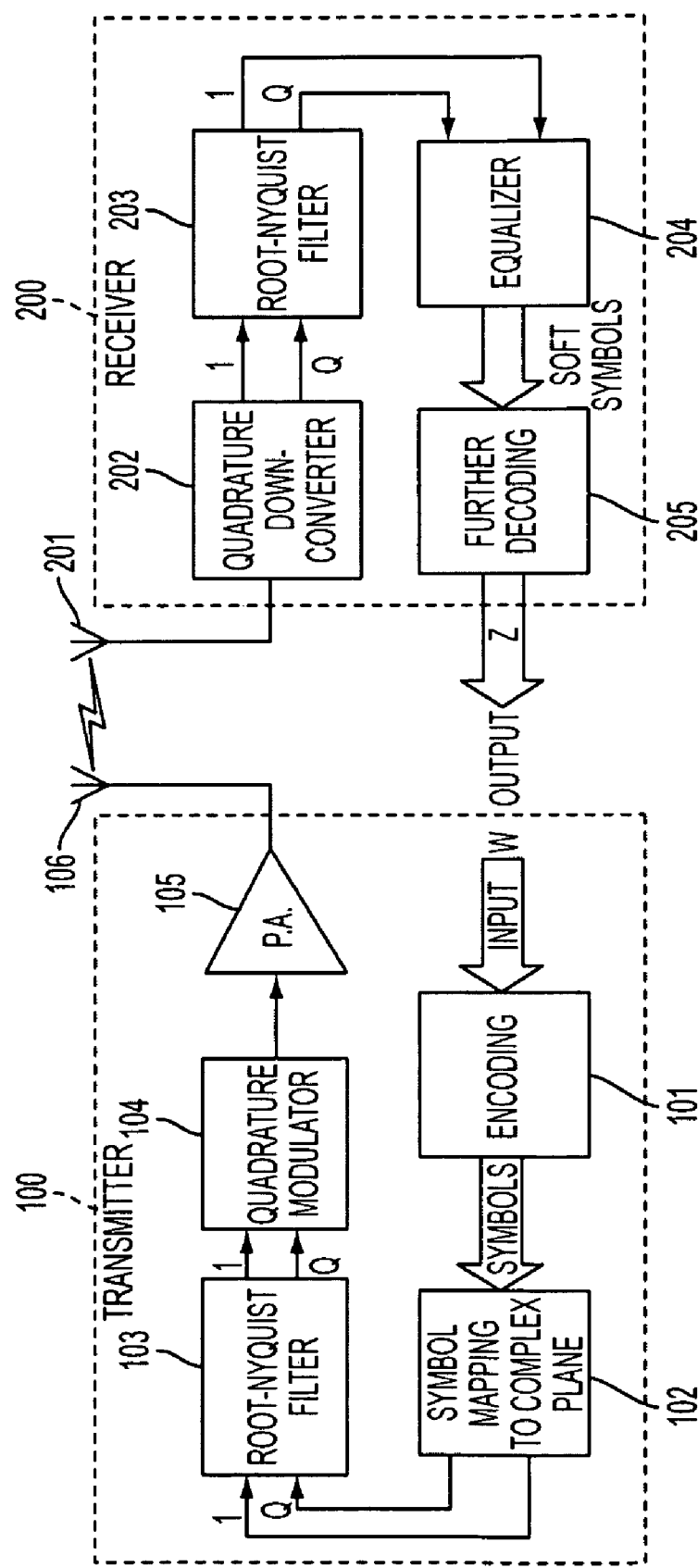
FIG. 1(a) illustrates a transmitter and receiver arrangement according to one embodiment.
Figure 1B:
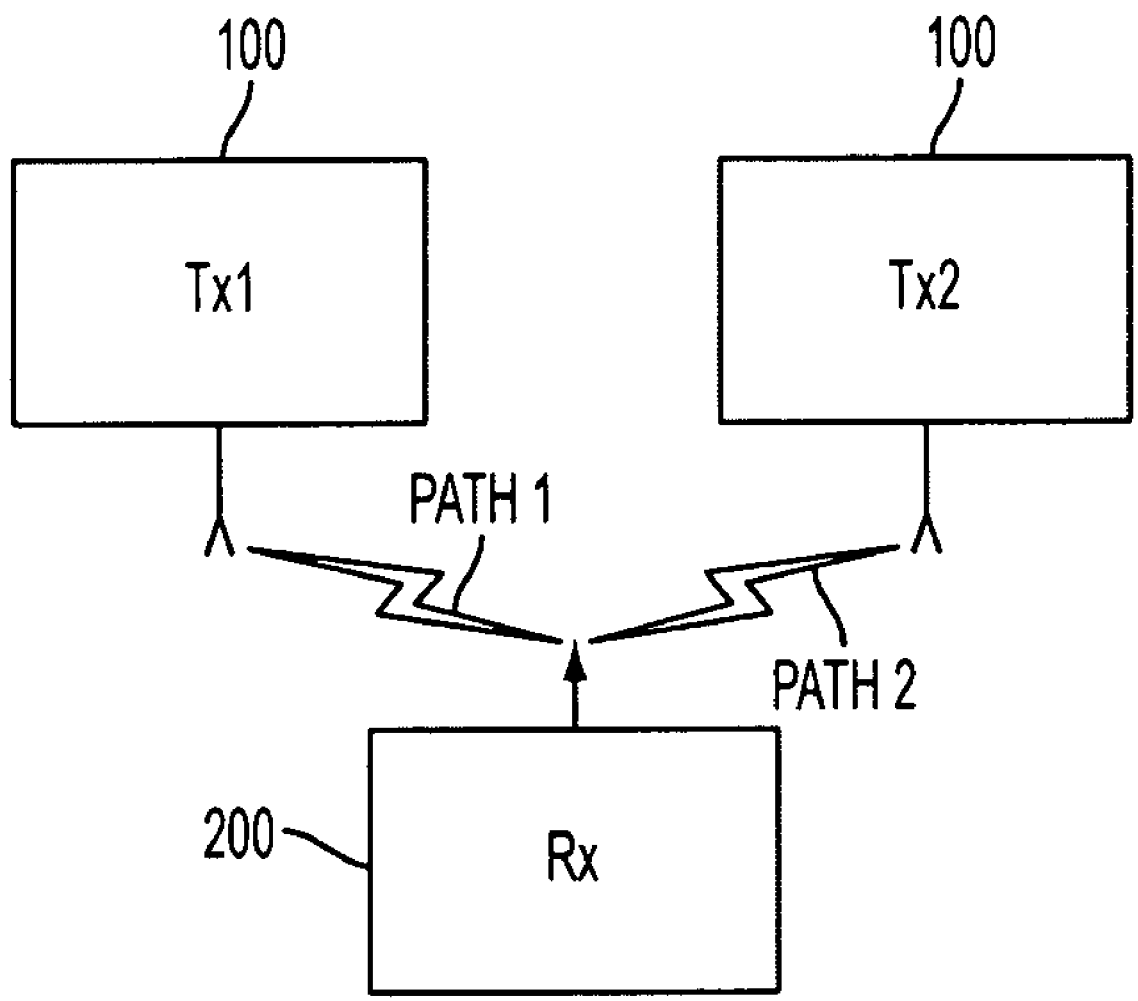
FIG. 1(b) illustrates two transmitters transmitting the same information signal along different paths to a receiver in which equalization techniques according to exemplary embodiments may be employed.

For context and referring to FIG. 1, a transmitter and a receiver arrangement in which equalization techniques according to one embodiment can be implemented is illustrated. Details regarding the equalization techniques themselves are discussed in more detail below. Transmitter 100 has an input W for information to be transmitted. Encoding 101 transforms the information to symbols for transmission using any suitable combination of source coding, error correction and detection encoding and interleaving. The encoded symbols are mapped to points in the complex radio signal plane by symbol mapper 102 to obtain I and Q sample streams which are each filtered using, for example, a Root-Nyquist filter 103. The filtered I, Q streams are now continuous-time waveforms which are applied to quadrature modulator 104 to be impressed upon the selected radio carrier frequency. The modulated radio signal is then amplified by power amplifier 105 and transmitted from antenna 106.

Receiver 200 performs the reverse operations of transmitter 100 to reproduce the information at output Z. Antenna 201 receives the signal and quadrature downconvertor 202, which may for example be a homodyne downconvertor, produces I, Q streams from the received signal. The I, Q streams can, for example, be Root-Nyquist filtered by filter 203 and sampled and digitized to produce I, Q sample streams which have now been doubly Root-Nyquist filtered, i.e., Nyquist filtered. The overall Nyquist filtering from the input of transmit filter 103 to the output of receive filter 203 has the property that, when sampled at the optimum instant at least, the receive I, Q samples correspond 1-for-1 with transmit I, Q values with substantially zero interference from neighboring symbols, i.e., with substantially zero Intersymbol Interference (ISI) for symbols from the same stream. The received I, Q values may however be changed in amplitude, rotated in phase and corrupted by noise. In addition, if the propagation channel between antenna 106 and antenna 201 comprises delayed multipath, ISI related to symbols between the different streams may arise. Equalizer 204 may be employed to correct for phase changes, amplitude changes and ISI, and to produce corrected "soft" symbols for further decoding in decoder 205, which performs the reverse function to encoder 101 in order to reproduce the information.

In one embodiment, multipath ISI may be principally due to the use of two transmitters 100 being used to transmit the same information which is received at receiver antenna 201 with a delay of L symbols between the paths generated by the two transmitters 100. This is illustrated conceptually in FIG. 1(b). The delay may, for example, be due to the two transmitters 100 being located at different distances relative to the receiver 200. For example, if the two transmitters 100 are orbiting satellite relays located in geostationary orbit at longitudes of 75 degrees (East Coast of USA) and 120 degrees (West Coast of USA), respectively, then signals propagate with different delays from the two satellites. If the same signals are intended to be received by fixed or mobile receivers in different locations, such as when the signals are broadcast entertainment signals for example, then it is impossible to choose the relative timing of the signals from the two satellites to synchronize them at all locations. In addition, for mobile receivers 200, e.g., satellite radio receivers in cars, travelling at 110 kM/hour (70 MPH) in directions perpendicular to the line bisecting the sightlines to the two satellites, differential Doppler shift is experienced. Exemplary values of differential delay (in mS) and Doppler shift (Hz) between the two (primary) signal paths generated by these two transmitters 100 for exemplary locations of receiver 200 is given below in Table 1.

TABLE 1

| | | |
|---|---|---|
| New York | −5.23 mS | 171 Hz |
| San Diego | 5.10 mS | 174 Hz |
| Miami | −5.00 mS | 176 Hz |
| Seattle | 5.06 mS | 168 Hz |
| Kansas City | 0.62 mS | 173 Hz |

An approach for addressing such differential delay may be to use symbol periods that are long compared to the differential delay, but then the differential Doppler shift would exceed the signal bandwidth. Conversely, if symbol rates much greater than the differential Doppler shift are used, then the differential delay is many symbol periods—e.g., over 10 symbol periods. Thus, same-frequency satellite diversity presents particular difficulties due to the product of the differential delay and the differential Doppler shift being of the order of unity.

There are other potential motivations to use symbol rates which are much greater than the Doppler shift. For example, in order to compensate for phase rotation and amplitude changes, the equalizer 204 should estimate these effects. This may be done by including known symbols in the transmitted symbol stream. By observing how those known symbols have been modified in propagation, the propagation channel effects may be determined. The error on the channel estimates may be reduced as more known symbols are used in making the estimate. When it is desired that estimation error should not be a significant cause of symbol errors, then the channel estimation errors must be significantly smaller than the noise on one symbol. Thus, many known symbols must be included in order to make accurate channel estimates. These symbols must be repeated periodically, as the channel changes at a rate comparable to the Doppler shift. Cellular standards may be used as a guide to the frequency of inclusion of known symbols for channel estimation. In the Global System for Mobile communication (GSM) system for example, 26 known symbols are included for channel estimation every 0.5 ms approximately. Thus, the known symbol rate is 52 KS/s. For the known symbols to represent an acceptable overhead of, e.g., less than 20%, the useful information rate should be greater than this by a factor of 4 or 5.

In the GSM system, the gross symbol rate is thus 270.833 KS/s which may be transmitted in 200 KHz wide frequency channels. This is much greater than the differential Doppler, which, therefore, is not a problem; however, the differential delay of +/−5 mS is 1350 symbols. An equalizer is therefore required which can handle two equal signals with a large number of symbols relative delay of the above order for decoding symbols with symbol error rates as close as possible to the error rates that would have been achieved using diversity transmission on different frequency channels.

Figure 2:
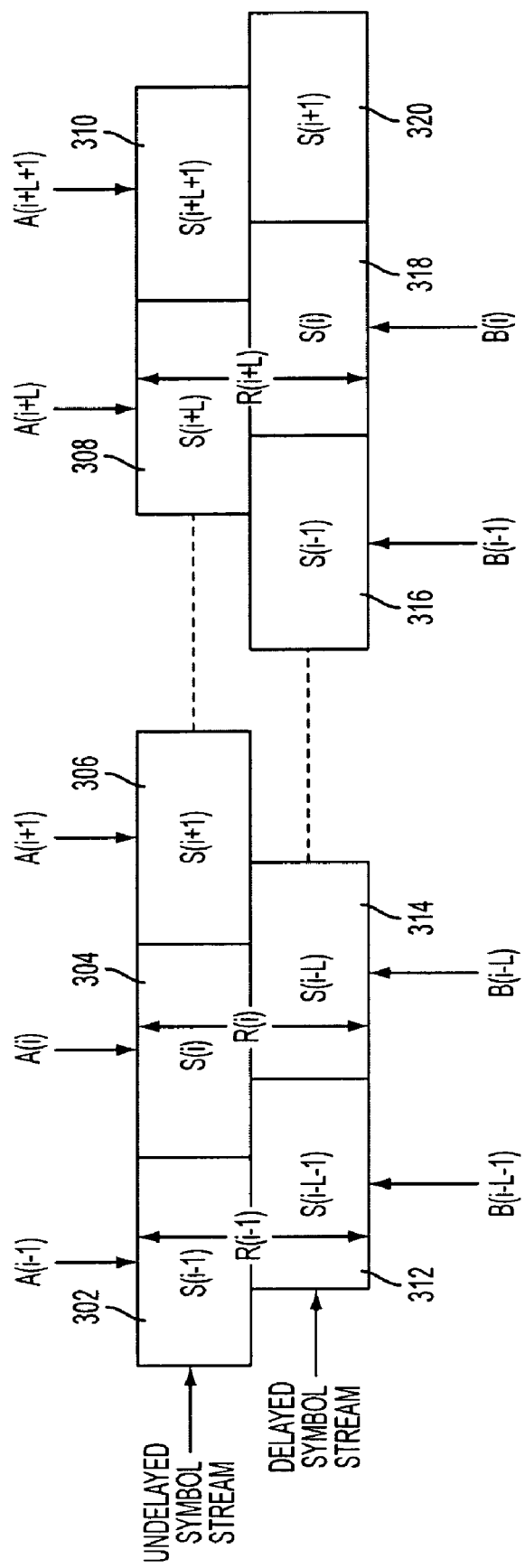
FIG. 2 illustrates two overlapping symbol streams received with a relative delay between L and L+1 symbol periods according to one embodiment.

Referring to FIG. 2, the reception of two overlapping symbol stream transmissions by a receiver 200 according to an exemplary embodiment is illustrated. For ease of reference, the topmost row of blocks (symbols) is referred to herein as the "undelayed" or "non-delayed" symbol stream, while the bottommost row of blocks (symbols) is referred to as the "delayed" symbol stream. The received symbol streams can, for example, have a relative delay of between L and L+1 symbol periods, i.e., a non-integer number of symbol periods. Thus, from left to right, the undelayed symbol stream is illustrated as including certain symbols S(i−1) 302, S(i) 304, S(i+1) 306 followed later in time by symbols S(i+L) 308, S(i+L+1) 310, while the delayed symbol stream is illustrated as including certain symbols S(i−L−1) 312, S(i−L) 314 followed later in time by symbols S(i−1) 316, S(i) 318. Note that, for example, the symbols S(i−1) 302 and 316 are the same symbols transmitted in two different symbol streams from different transmitters 100.

Regarding sampling of the two symbol streams, the receiver 200 can sample the composite signal at points labelled A, which are in the center of symbols for the non-delayed symbol stream, or at points B, which are in the center of symbols of the delayed symbol stream, or at arbitrary points labelled R, which are not in the center of symbols of either stream. The receiver 200 can alternatively sample the composite signal at both points A and B, or at multiple instances per symbol period such as points R.

In general, the frequency of sampling according to exemplary embodiments should preferably meet the Nyquist criterion, i.e., to be at least twice the highest signal, noise or interference frequency present in the composite received signal. This sampling is carried out after the receiver 200 has imposed its Root-Nyquist filtering at block 203, so two samples per symbol, such as using both points A and B, suffices. A small degradation would typically be encountered by using only points A or B (or R) for sampling, but alternatively, two points per symbol period such as points R would equally suffice to avoid such degradation. When a symbol is sampled in its center and the overall filtering comprising the transmit and receive filters is Nyquist, then no intersymbol interference is experienced from symbols of the same stream. Thus sampling point A(i) depends on symbol S(i) 304 but not on symbols S(i−1) 302 or S(i+1) 306. However, sampling point A(i) does depend on several symbols around symbol S(i−L) 314 of the delayed stream, as those symbols are not sampled in their centers for points A. Conversely sample B(i) depends on symbol S(i) 318 of the delayed symbol stream and not on symbols S(i−1) 316 or S(i+1) 320 of the delayed stream, but depends on several symbols around symbol S(i+L) 308 of the non-delayed stream. Sample R(i) however depends on several symbols around symbol S(i) 304 of the undelayed stream as well as several symbols around symbol S(i−L) 314 of the delayed stream.

Figure 3:
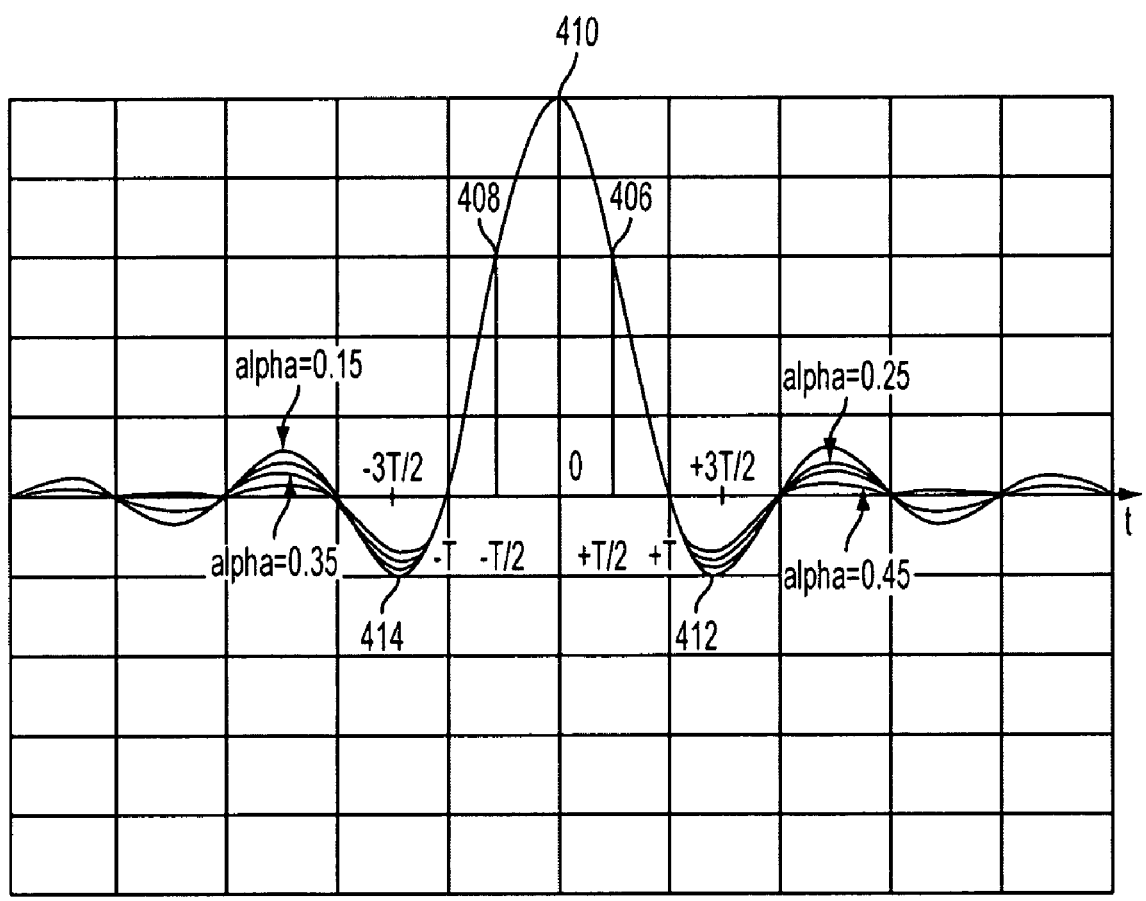
FIG. 3 illustrates an impulse response for exemplary Raised Cosine Nyquist filtering according to one embodiment.

To determine the magnitude of the dependence on a particular symbol of an off-centered sample, reference may be made to the known impulse response of the overall Nyquist filtering. Referring to FIG. 3, impulse responses for exemplary Raised Cosine Nyquist filtering are illustrated. The Nyquist responses pass through zero at multiples of the bit period T away from center of the graph. However, at other sampling instants, the responses are not zero. For example, a sample taken half the bit period, i.e., T/2 406 or −T/2 408 from center, has a value of about 0.6 of the peak value 410, while a sample 412, 414 taken at +/−3T/2 away from center has a value of about −0.2 times the peak value, for the sharpest cutoff filter (alpha=0.15). Thus, the sample taken T/2 406 later than the center of symbols S(i) will depend on neighboring symbols according to the following formula:

$$\ldots -0.2S(i-1)+0.6S(i)+0.6S(i+1)-0.2S(i+2)\ldots$$

omitting the smaller dependencies on earlier and later symbols.

The value of the parameter "alpha" in FIG. 3 determines how sharply the frequency response of the filtering falls to zero. The filter frequency response becomes zero at +/−(1+alpha)/2 times the symbol rate. For example, using the GSM (I,Q) bitrate rate of 13 MHz/96 and channel spacing of 13 MHz/65, theoretically perfect adjacent channel isolation occurs when:

$$1+\text{alpha}=96/65, \text{ or alpha}=31/65=0.477.$$

The use of filters with less sharp frequency response cutoffs (i.e., higher alpha values) results in smaller dependencies on earlier and later symbols. Even with an alpha of 0.6, interference from adjacent channels is acceptably small and allows the dependency of off-center samples to be truncated to two symbols. In general, this dependency may be expressed as:

$$\text{Sample}(i,t)=h(t-T)S(i-1)+h(t)S(i)+h(t+T)S(i+1) \quad (1)$$

for sampling off-center by an amount t, where the function h is the impulse response as shown in FIG. 3. For large alpha values, h(t+T) may be small enough to neglect the third term in equation (1). For example, for alpha=0.6 and mis-sampling of t=T/4, the values are approximately:

$$h(t)=0.9$$

$$h(t-T)=0.25$$

$$h(t+T)=-0.09$$

The received signal samples are in addition weighted by the propagation channel phase and amplitude factor, denoted by C1 for the undelayed channel and C2 for the delayed channel. Referring again to FIG. 2, it will thus be understood by those skilled in the art that the expected value of sample A(i) is given by:

$$A(i)=C2.h(T-t).S(i-L-1)+C2.h(-t).S(i-L)+C1.S(i)$$

where t is the fractional symbol period delay of the delayed stream in excess of L symbol periods.

An expression for sample B(i) likewise is:

$$B(i)=C2.S(i)+C1.h(t).S(i+L)+C1.h(-T+t).S(i+L+1).$$

Assuming samples R(i) are positioned to the right of center of the undelayed symbols by the same amount as they are left of center to the delayed symbols, an expression for R(i) would be:

$$R(i)=C1.h(t/2)/S(i)+C1.h(-T+t/2).S(i+1)+C2.h(T-t/2).S(i-L-1)+C2.h(-t/2)S(i-L).$$

Using this framework, an equalizer according to an exemplary embodiment can be constructed that determines the sample sequence S by processing only the received samples R, that is, a one-sample per symbol equalizer. Condensing the notation somewhat, the equations which then have to be solved are shown collected below into every equation that depends on a particular symbol S(i) 304, 318:

$$\begin{array}{lll}
q1.S(i-L-2) + q2.S(i-L-1) & +q3.S(i-1) + q4.S(i) & = R(i-1) \\
q1.S(i-L-1) + q2.S(i-L) & +q3.S(i-1) + q4.S(i+1) & = R(i) \\
q1.S(i-1) + q2.S(i) & +q3.S(i+L) + q4.S(i+L+1) & = R(i+L) \\
q1.S(i) + q2.S(i+1) & +q3.S(i+L+1) + q4.S(i+L+2) & = R(i+L+1)
\end{array}$$

where $q1=C2.h(T-t/2)$ $q2=C2.h(-t/2)$ $q3=C1.h(t/2)$ and $q4=C1.h(-T+t/2)$

The occurrence of symbol S(i) in the above equations essentially appears along a diagonal of the matrix or box of equations set forth above, the diagonal being indicated by the bracketed terms in the middle of the box above. Symbols earlier than S(i) appear above the diagonal and symbols later than S(i) appear below the diagonal. If all of these other symbols were known, their terms could be shifted to the right leaving four equations in S(i). Choosing S(i) to satisfy these in a least-squares residual error fashion gives the best hard decision for S(i). Alternatively, the sum of the squares of the residual errors (the "Metric" M) for each possible S(i) value can be computed, and a likelihood for each S(i) value is computed from equation (2) below:

$$P(si) = \frac{\text{EXP}[-M(Si)/2\sigma^2]}{\sum_{Si} \text{EXP}[-M(Si)/2\sigma^2]} \quad (2)$$

In equation (2), the denominator term ensures that the sum of the probabilities over the whole symbol alphabet is unity. A person skilled in the art of equalizers may also be aware that the computations of metrics can be formulated in a way due to Ungerboeck, in which the received signal is first multiplied by a matched filter FIR filter with taps given by the conjugates of above-defined "q" values.

If the probabilities of S(i) were computed taking into account the probabilities of the other symbols being a variety of values, their probabilities in turn being iteratively refined based on each new computation of the probabilities for a given symbol, the equalizer would be of the type known in the art as a "Turbo Equalizer", as discussed in the paper by M. Tüchler, R. Koetter and A. C. Singer, entitled "Turbo Equalization: Principles and New Results", IEEE Transactions on Communications, vol. 50, pp. 754-767, May 2002. However, the amount of computation per decoded or equalized symbol needed to perform turbo equalization is prodigious. Therefore, a method is desirable for reducing the amount of computation needed to estimate the most likely values of the symbols S(i).

By way of contrast, and according to exemplary embodiments of the present invention, a symbol is estimated by using the equations in which it appears, i.e., using all received samples that it affects, and subtracting the effects of other symbols above and below the diagonal. For symbols above the diagonal, for which estimates have already been made, the most probable values are used. Symbols below the diagonal, which have not yet been estimated, are hypothesized. An estimate of the current symbol is made for each of the possible combinations of hypothesized symbols, giving rise to a set of possible decodings for the current symbol. For each possible decoding, the value of an above-diagonal symbol used is the best previously made estimate of that symbol that was made with the same hypotheses of the current below-diagonal symbols.

Equation (3) below is the estimate for the "soft" value of symbol S(i) which is ultimately computed by exemplary embodiments to determine the final values of the four above-diagonal symbols S(i−1), S(i−L−1) and S(i−L−2), and the four below-diagonal symbols S(i+1), S(i+L), S(i+L+1) and S(i+L+2).

$$S(i) = \frac{\begin{bmatrix} q4^* \begin{bmatrix} R(i-1) - q3 \cdot S(i-1) - q2 \cdot \\ S(i-L-1) - q1 \cdot S(i-L-2) \end{bmatrix} \\ q3^* \begin{bmatrix} R(i) - q4 \cdot S(i+1) - q2 \cdot \\ S(i-L) - q1 \cdot S(i-L-1) \end{bmatrix} \\ q2^* \begin{bmatrix} R(i+L) - q4 \cdot S(i+L+1) - q3 \cdot \\ S(i+L) - q1 \cdot S(i-1) \end{bmatrix} \\ q1^* \begin{bmatrix} R(i+L+1) - q4 \cdot S(i+L+2) - q3 \cdot \\ S(i+L+1) - q2 \cdot S(i+1) \end{bmatrix} \end{bmatrix}}{[|q1|^2 + |q2|^2 + |q3|^2 + |q4|^2]} \quad (3)$$

A "hard" estimate of each symbol is first made by determining the value of symbol S(i) which minimizes the sum of the squares of the residual errors in the four equations containing S(i) for given values of the above and below diagonal symbols. The sum-squared error or Metric is computed and stored against each of the $M^4$ hypotheses of the four below-diagonal symbols along with the corresponding hard decision for S(i).

A data structure for storing the results in memory is shown below, assuming binary symbols (M=2):

| Hard Decision For S(i) | Below-diagonal symbols | | | | Metric value |
|---|---|---|---|---|---|
| | S(i + 1) | S(i + L) | S(i + L + 1) | S(i + L + 2) | |
| 0 | 0 | 0 | 0 | 0 | 13.25 |
| 1 | 0 | 0 | 0 | 1 | 12.13 |
| 1 | 0 | 0 | 1 | 0 | 12.05 |
| 1 | 0 | 0 | 1 | 1 | 11.37 |
| 0 | 0 | 1 | 0 | 0 | 14.82 |
| 0 | 0 | 1 | 0 | 1 | 17.91 |
| 1 | 0 | 1 | 1 | 0 | 12.43 |
| 1 | 0 | 1 | 1 | 1 | 12.01 |
| 0 | 1 | 0 | 0 | 0 | 15.67 |
| 0 | 1 | 0 | 0 | 1 | 16.21 |
| 0 | 1 | 0 | 1 | 0 | 14.94 |
| 0 | 1 | 0 | 1 | 1 | 15.85 |
| 0 | 1 | 1 | 0 | 0 | 11.92 |
| 1 | 1 | 1 | 0 | 1 | 11.55 |
| 1 | 1 | 1 | 1 | 0 | 14.33 |
| 0 | 1 | 1 | 1 | 1 | 18.16 |

In the above table, as well as that provided below for symbol S(i−1), the illustrative values entered for S(i) and the Metrics are exemplary only, as they depend on the actual noisy signal samples received.

A similar table for hard decisions of S(i−1) would previously have been constructed as, for example, shown below.

| Hard Decision For S(i − 1) | Below-diagonal symbols | | | | Metric value |
|---|---|---|---|---|---|
| | S(i) | S(i + L − 1) | S(i + L) | S(i + L + 1) | |
| 1 | 0 | 0 | 0 | 0 | 12.45 |
| 0 | 0 | 0 | 0 | 1 | 13.14 |
| 1 | 0 | 0 | 1 | 0 | 13.89 |
| 1 | 0 | 0 | 1 | 1 | 12.56 |
| 1 | 0 | 1 | 0 | 0 | 15.67 |
| 1 | 0 | 1 | 0 | 1 | 14.91 |
| 0 | 0 | 1 | 1 | 0 | 13.45 |
| 0 | 0 | 1 | 1 | 1 | 16.57 |
| 0 | 1 | 0 | 0 | 0 | 11.04 |
| 0 | 1 | 0 | 0 | 1 | 12.55 |
| 0 | 1 | 0 | 1 | 0 | 14.32 |
| 0 | 1 | 0 | 1 | 1 | 15.23 |
| 0 | 1 | 1 | 0 | 0 | 16.12 |
| 0 | 1 | 1 | 0 | 1 | 17.09 |
| 1 | 1 | 1 | 1 | 0 | 18.66 |
| 1 | 1 | 1 | 1 | 1 | 14.87 |

When constructing the table for S(i), a value for S(i−1) may be required for computing each of the 16 hard decisions for S(i). The value for S (i−1) may be selected from the table previously constructed for S(i−1) as follows:

1. For line 1 in the table for S(i), select the best of the two S(i−1) values from the S(i−1) table made with below-diagonal symbol hypotheses S(i)=0; S(i+L−1)=0; S(i+L)=0 and S(i+L+1)=0 and compute the metric for S(i)=0; S(i+1)=0; S(i+L)=0; S(i+L+1)=0 and S(i+L+2)=0. From the S(i−1) table, it can be seen that the two metrics to be compared for S(i)=0 are 12.45, for the case S(i+L−1)=0 and 15.67 for the case S(i+L−1)=1. The 12.45 value is lower, therefore the value S(i+L−1)=0 is used.

2. Repeat step (1) for S(i)=1. In this case the two metrics compared are 11.04 and 16.12. The lower metric of 11.04 happens to be associated with a value S(i+L−1)=0, so that value of S(i+L−1) is used in this case to compute the metric for S(i)=1.

3. Select the value of S(i) from steps (1) and (2) according to which gave the lower metric and store that value of S(i) and its associated metric in the first row of the S(i) table.

4. Repeat steps (1), (2) and (3) above for all remaining combinations of S(i+1), S(i+L), S(i+L+1) and S(i+L+2) to fill in successive rows of the S(i) table.

In the above process, the value of S(i−1) which was propagated forward to compute the S(i) table was the best of two estimates of S(i−1) made with the hypotheses 0 and 1, respectively, for the future symbol S(i+L−1). It is not a certainty that that value of S(i−1) is the correct one to propagate, but this exemplary embodiment also contemplates revisiting that decision after the table of estimates of S(i+L−1) has been constructed L−1 symbols later. Thus, choosing a value of S(i−1) to use in calculating the rows of the S(i) table based on an effectively early choice of S(i+L−1) is a mechanism by which these exemplary embodiments avoid the exponential growth of states that would occur in an Maximum Likelihood Sequence Estimation (MLSE) equalizer which attempted to, for example, equalize these types of channels. It is common in depicting the operation of the Viterbi MLSE process to draw a Trellis diagram showing how the decoder states at one instant feed into decoder states at a future instant. In the Viterbi MLSE algorithm, these states are termed predecessor and successor states. The successor states replace the predecessor states and may in fact occupy the same place in memory. In an exemplary embodiment of the present application, successive states do not replace previous states but instead provide that symbol estimates of previous states are fed forward. The states as described in these exemplary embodiments are not, therefore, termed predecessor and successor states as they are earlier computed states and not overwritten by later computed states, but rather left in memory for a future refinement iteration.

Figure 4:
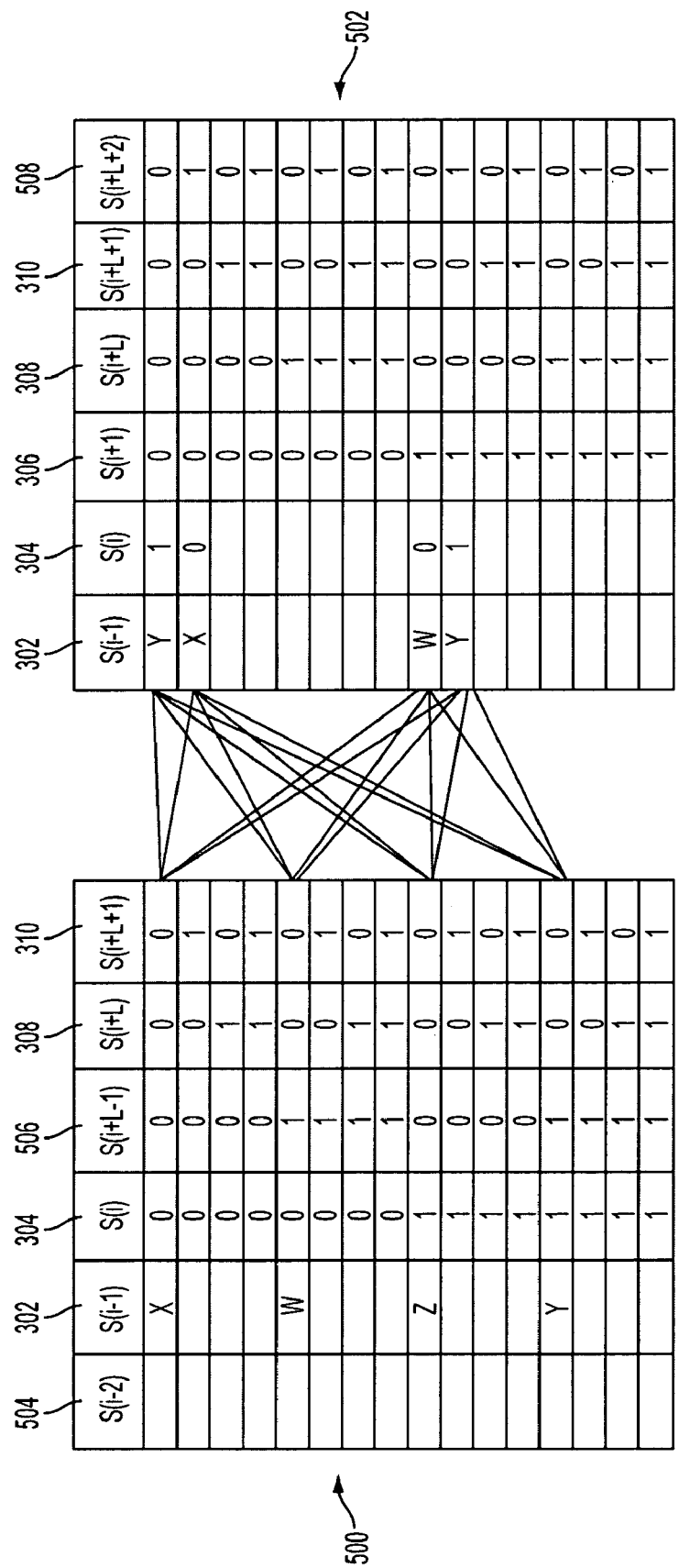
FIG. 4 illustrates a table of estimated S(i−1) values, a table of estimates for the next symbol, S(i) and symbol estimate propagation between successive states according to one embodiment.

Referring to FIG. 4, a table 500 of estimated S(i−1) symbol 302 values, a table 402 of estimates for the next symbol, S(i) symbol 304 and symbol estimate propagation between successive states are illustrated. More specifically, on the left side of FIG. 4 is a table 500 of estimated S(i−1) symbol 302 values, the values having been estimated for hypotheses of the future symbols S(i) 304, S(i+L−1) 506, S(i+L) 308 and S(i+L+1) 310. Four estimates of symbol S(i−1) 302 in the table 502 are labelled X, W, Z and Y. On the right side of FIG. 4 is the table 504 of estimates for the next symbol, S(i) 304, which are to be calculated. The future symbols that should be hypothesized for computing estimates of symbol S(i) 302 are S(i+1) 306, S(i+L) 308, S(i+L+1) 310 and S(i+L+2) 508. Two of these table entries, namely S(i+L) 308 and S(i+L+1) 310 are common to the hypotheses made for computing the S(i−1) 302 estimates. Thus, for example, when computing a metric for a particular candidate value of S(i) 304, that value plus the values of the two common future symbols may be used to address the S(i−1) table 500 to obtain two candidate values of S(i−1) 302 to use—one for each value of the future symbol S(i+L−1) 506 not common to the S(i) table 502.

Between these two candidates for S(i−1) 302, that which has the lower metric in the S(i−1) table 400 is selected to compute the metric for the given S(i) 302 value, say S(i)=0. Then the process is repeated for the other candidate S(i) 304 value, S(i)=1. That selects S(i−1) 302 values from two other locations in the S(i−1) table 400. The S(i) 304 value that gives the lower new metric calculation is then inserted in the S(i) table 402 against the given hypothesis for the four future symbols S(i+1) 306, S(i+L) 308, S(i+L+1) 310 and S(i+L+2) 508. Moreover, the S(i−1) 302 value that was used to compute the winning S(i) 304 value is either transferred to the S(i)

table 502, or the location in the S(i−1) table 500 from which it was selected as a traceback pointer.

FIG. 4 shows the actual value (X, Y, W or Z) being stored. The location in the S(i−1) table 500 which gave the winning value of S(i) 304 is shown linked by a bold line between the tables. For example, the best value of S(i) 304 in the S(i) table 502 for future symbols hypothesized to be 1000 was S(i)=0, and the value of S(i−1) 302 which gave the lowest metric for S(i)=0 and those future symbols was the value W, which occurred with S(i−L−1)=1 rather than 0. Hence the value S(i−1)=W is associated with that row of the S(i) table 502. It will also be appreciated by those skilled in the art that each line of the S(i) table 500 uses a selection of S(i−1) from one of four rows (labelled X, Y, W, Z over both values of S(i) and both values of S(i+L−1)) of the S(i−1) table 502.

It can be understood that these exemplary embodiments can differ from MLSE also in other respects than those described above. For example, metrics generated by these exemplary equalization techniques need not be accumulated, e.g., summed along a path in a Viterbi trellis, but can instead be stored. A 16-row table of metrics and hard decisions can be stored in memory for each symbol processed until at least L such tables have been stored, where L is equal to the differential signal delay in symbol periods (if the signal delay is an integer number of symbols long) or close to the differential signal delay if the signal delay has a value that is a non-integer multiple of the symbol period. Thus the amount of memory used for exemplary embodiments is linearly proportional to the differential signal delay, and not exponential, as with MLSE. In the satellite example above, there could, for example, be approximately 1350 16-row tables stored in a receiver 200's memory, (or 256-row tables for quaternary QPSK symbols), with each table row containing a symbol hard decision and an associated metric. In addition, it can be useful to store an index in each row of the table for S(k) indicating which row of the table for S(k−1) the value of S(k−1) came from. This can be used for traceback in determining the final output of the equalizer. Optionally, the soft value of S(k) can also be precomputed and stored in the table for future extraction, as many of the computations are common to computing the metrics.

When the table of estimates for symbol S(i+L−1) are computed, those estimates will depend on a previously computed value of S(i−1) through the second of the four equations in the matrix above which are re-indexed as follows:

$$q1.S(i-2)+q2.S(i-1)+q3.S(i+L-1)+q4.S(i+L)=R(i+2L-1)$$

It was described above how the below-diagonal symbols are hypothesized, and the immediately prior symbol is selected from the immediately preceding table. It was not previously described how the symbols L and L−1 earlier were selected, i.e. symbols S(i−1) and S(i−2) in the above equation. Symbol S(i−1) may be selected from the S(i−1) table for the computation of the S(i+L−1) table by choosing a value of S(i−1) computed for S(i+L−1)=0 when evaluating the metric for S(i+L−1)=0 and selecting a value of S(i−1) computed for S(i+L−1)=1 when computing the metric for S(i+L−1)=1. The value of S(i−2) needed may be obtained by using the traceback information associated with the selected S(i−1) value. Alternatively, another method will be described below with respect to FIG. 5.

Figure 5:
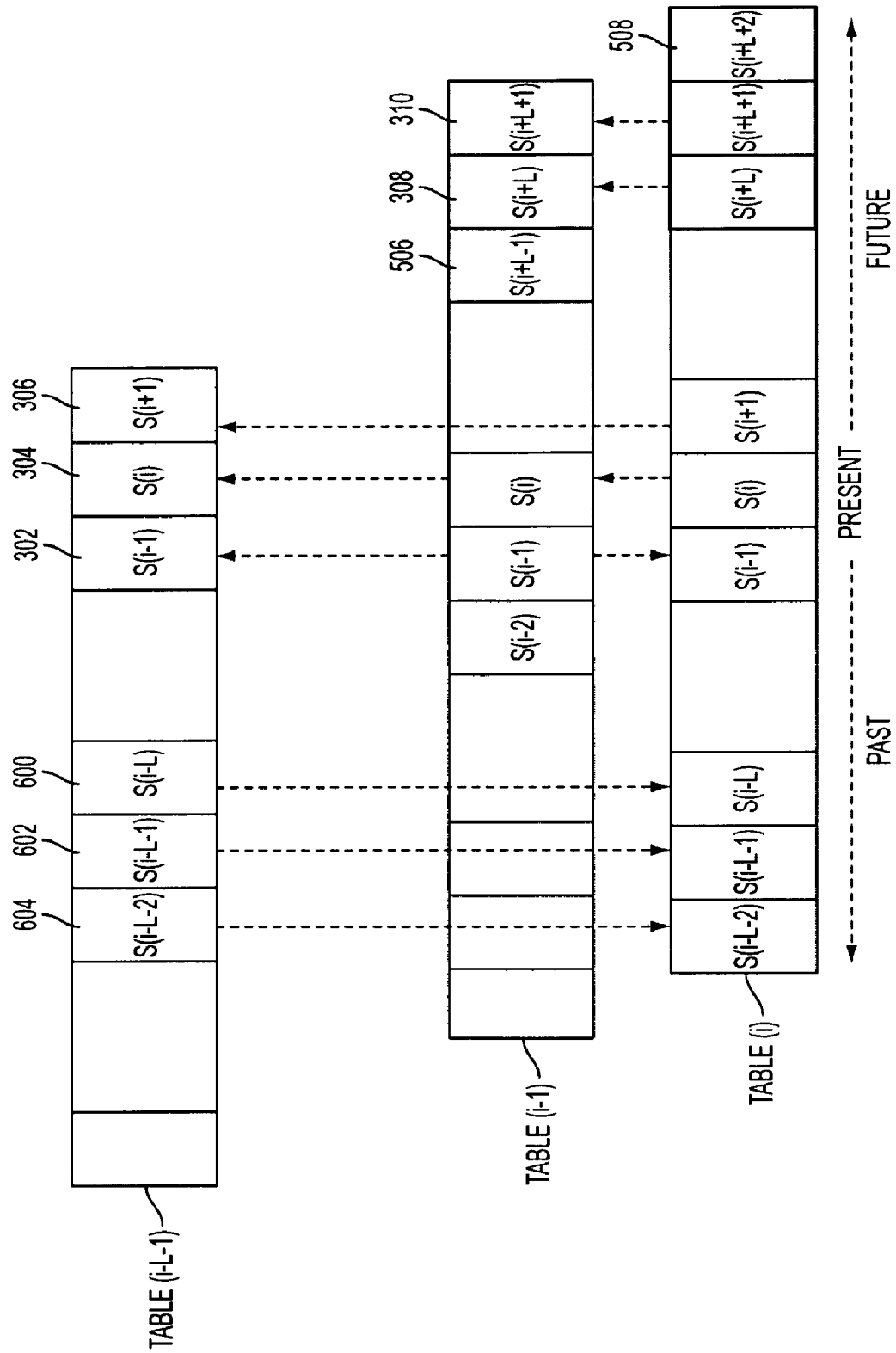
FIG. 5 illustrates the linking of symbol values between successive states and between states L apart according to one embodiment.

Referring now to FIG. 5, the linking of symbol values between both successive states and between states L symbols apart for equalization according to an exemplary embodiment is illustrated. Where applicable, the same symbol numbering as was used in FIGS. 2 and 4 is reused again in FIG. 5. The order of progression in developing a new table for the next symbol S(i) 304 according to an exemplary embodiment is as follows. A hypothesis is made of the future symbols S(i+1) 306, S(i+L) 308, S(i+L+1) 310, and S(i+L+2) 508 on which the choice of the S(i) 304 value to place in the table will depend. A particular value of S(i) 304 is then selected for testing. This particular value of S(i) 304, together with the hypotheses for S(i+L) 308 and S(i+L+1) 310 are used to address the previous table for S(i−1). There is as yet no source for S(i+L−1) 506, so both values are tried and that which gives the lower metric is selected. The associated value of S(i−1) 302 is then read from that row of the S(i−1) table and used to compute the metric for the S(i) 304 value under consideration.

At the same time, the hypothesized value of S(i+1) 306, the tested value of S(i) 304 and the just-extracted value of S(i−1) 302 are used to address the table computed for S(i−L−1) approximately L signal samples/symbol periods earlier. Since there is no source for the other symbol, S(i−L) 600, on which the decision for S(i−L−1) 602 depended, both are tried and that which yields the lower metric in the S(i−L−1) table is used. That value of S(i−L) 600, together with the associated decision for S(i−L−1) 602 and the associated value of S(i−L−2) 604 are then used for the above-diagonal symbols (past symbols) needed to compute a metric for the S(i) table. The above is repeated for the other value of S(i) 304 and the value which gives the lower metric is the decision for S(i) 304 entered into the row of the S(i) table for the given set of four hypothesized future symbols. Repeating this process for all combinations of the hypothesized symbols completes the S(i) table.

When a signal is received, sampled, and the sample stored in memory, the signal samples can either be processed successively moving forward in time, as described, or alternatively and equally well processed backwards in time, or both. When processing backwards in time, the above-diagonal symbols (i.e., in this example S(i−1) 302, S(i−L) 600, S(i−L−1) 602, S(i−L−2) 604) become the hypothesized symbols when computing the table for S(i) 304, and below-diagonal symbols become the "past" symbols. It is also possible to process forwards and then back-substitute decisions for later symbols, such as S(i+L−1) 506 in the S(i−1) table for which no current source was available in the above. When a symbol such as S(i+L−1) 506 is later decided and back-substituted, it effectively contracts the number of states of the S(i−1) table that need be retained. It can be noted whether or not that decision changed any value of S(i−1) 302 fed forward. If so, the algorithm may backtrack to the point reached as shown in FIG. 5, and the new value of S(i−1) 302 is fed forward. It can then in turn be noted whether that decision changed any decision for S(i) 304, and if a different value of S(i) 304 would have been fed forward to the S(i+1) table.

It may be anticipated that eventually the propagation of such changes according to this exemplary embodiment would die out, so that an entire second iteration is not necessarily involved. Finally, when an entire block of data has been processed and decisions deemed as good as possible have been obtained, any remaining states in a table are reduced or contracted to one by selecting the lowest metric. Equation (3) may be used to compute a "soft" decision for the symbol which is fed to error correction decoding. Soft values may be selected for error correction decoding in an order determined by an interleaving table. Error-corrected data from the error correction decoding process can then be used to reconstruct symbols or partial symbols which, having a higher reliability thanks to error correction coding, can be back-substituted into either equation (3) or further into a refining iteration of the equalization process.

According to an exemplary embodiment, the decision regarding whether a refining iteration of the equalization process is desirable can be made to depend on whether error-correction decoding passed an error-detection criterion such as a cyclic redundancy check (CRC). If such a check passes, it may be unnecessary to execute a refining pass. A "partial symbol reconstruction" occurs for example when one bit of a multi-bit symbol, such as a QPSK symbol, can be determined, but not the other(s). Effectively the alphabet is contracted for that symbol. Other instances of wholly determined or partially determined symbols can arise when known symbols are periodically inserted into the transmission to assist in channel estimation, i.e., determination of the coefficients $q^1, q^2, q^3, q^4$. Encountering a known symbol in the set of hypothesized symbols contracts the number of states that have to be computed for some symbols. Also, no state table need be computed for a completely known symbol. In some cases, only a fraction of the symbols equalized in a given block may be error correction decoded, possibly in conduction with another fraction from previously equalized blocks (i.e., when block-diagonal interleaving is in use). In that case, back-substituting error-corrected symbols from a successful error-correction decoding into a re-run of the equalization process in which the back substituted symbols are now treated as known symbols can serve to improve the decisions for the as-yet undecoded symbols. This process can also be reversed in time wherein error-corrected symbols from a successful error-correction decoding can be back-substituted to improve equalization of symbols that previously did not error-correction-decode correctly.

Another variant of the above is to perform equalization based on the samples A(i) and B(i) defined above rather than R(i). There are then six equations that involve the same symbol S(i), as shown in equations (4) below:

with larger state tables when the number of adjacent symbols on which a received sample depends is more than that assumed in the above exemplary implementations.

Thus, the afore-described exemplary embodiments describe how to equalize the effect of ISI to a given symbol from a small group of nearby symbols, as well as a small group of symbols separated by an arbitrary number of symbol periods in time. Such a receiver equalizer is useful, for example, when receiving diversity transmissions from two transmitters located at different distances, when the transmissions are destined to be received by multiple receivers at different locations, and it therefore cannot be arranged to synchronize the transmissions accurately at all receivers.

Figure 6:
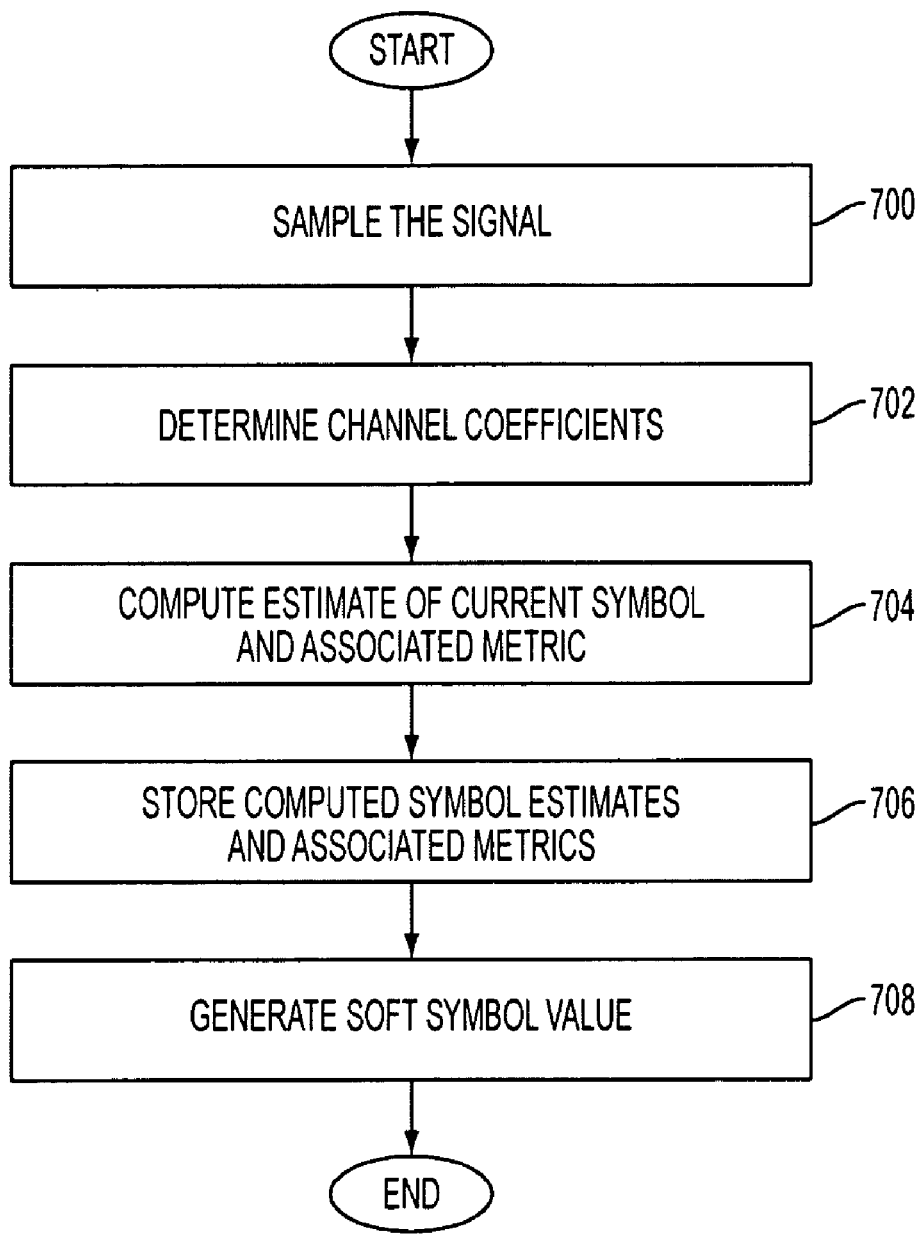
FIG. 6 illustrates a functional block diagram for decoding signals received via delayed paths according to one embodiment.

Referring to FIG. 6, a flow chart for decoding signals received via a plurality of paths according to an embodiment is illustrated. Therein, sampling the signal to obtain at least one sample per data symbol time interval is performed at block or step 700. A set of complex channel coefficients that characterize the relatively delayed paths is determined at block or step 702. An estimate of a current symbol and an associated metric are computed at block or step 704. The current symbol estimate and the associated metric can be based on the sampling of the signal, the determining of the set of complex channel coefficients, estimates of previously estimated symbols, and hypotheses of not yet estimated symbols. The current computed symbol estimates and associated metrics are stored at block or step 706, along with each combination of the hypothesized symbols, in a metric table for the current symbol. A soft symbol value is generated at block or step 708 for a symbol based on the sampled signal, the determined set of channel coefficients and the computed estimates of symbols.

The techniques described herein may be implemented by various means. For example, these techniques may be implemented in hardware, software, or a combination thereof. For a hardware implementation, the processing units within a base station or a mobile station may be implemented within $$
\begin{aligned}
B(i-L-1) &= C2.S(i-L-1) + C1.h(t).S(i-1) + C1.h(-T+1).S(i) \\
A(i) &= C2.h(T-t).S(i-L-1) + C2.h(-t).S(i-L) + C1.S(i) \\
B(i-L) &= C2.S(i-L) + C1.h(t).S(i) + C1.h(-T+t).S(i+1) \\
A(i+L) &= C2.h(T-1).S(i-1) + C2.h(-t).S(i) + C1.S(i+L) + C1.h(T+t).S(i+L+1) \\
B(i) &= C2.S(i) + C1.h(t).S(i+L) + C1.S(i+L+1) \\
A(i+L+1) &= C2.h(T-1).S(i) + C2.h(-t).S(i+1) +
\end{aligned}
\qquad (4)
$$

When a metric for S(i) 304 is computed using equations (4), it depends on only three, not four, future symbol hypotheses S(i+1) 306, S(i+L) 308 and S(i+L+1) 310, and on only two above-diagonal symbols S(i−L−1) 602 and S(i−L) 600 thanks to the choice of the sampling instants for A(i) and B(i) to be Nyquist for at least one of the two signal streams. This may be true when the net transmit plus receive filtering is not too sharp in the frequency domain, e.g., Alpha>0.45. Samples at the instants A(i) and B(i) may be derived from samples taken at other times by a suitable interpolation algorithm. Since the metrics depend on one fewer past and future symbol, the number of states required in each table is reduced, and faster convergence to optimum symbol decisions may be expected. Conversely, the equalization techniques associated with exemplary embodiments described herein may be used one or more application specific integrated circuits (ASICs), digital signal processors (DSPs), digital signal processing devices (DSPDs), programmable logic devices (PLDs), field programmable gate arrays (FPGAs), processors, processors, micro-processors, microprocessors, other electronic units designed to perform the functions described herein, or a combination thereof.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The paths of interest for equalization according to these exemplary embodiments may include, for example, delayed paths that are deliberately created by using two or more transmitters as well as delayed paths that are naturally present due to using a modulation symbol period that is short compared to naturally arising delays. For example, relatively long delayed paths can occur in ionospheric propagation due to ground waves and ionospherically reflected waves, or waves that are reflected from two different layers in the ionosphere. In particular, but merely as an example, equalizers according to these exemplary embodiments are intended to provide good equalization performance on delayed paths which have a relative delay therebetween of 25 symbol periods (or more), including relative delays which are non-integer multiples of the symbol period as mentioned above, and without undue algorithmic complexity, e.g., computational complexity on the order of the symbol alphabet M to a small power, and memory requirements linearly proportional to the delay in symbol periods.

As mentioned above, exemplary embodiments are intended to be effective for equalizing delay paths having delays which have a length that is a non-integral multiple of the symbol period. For such cases, the tables described above can be accommodated as follows. Given a non-integral delay between L and L+1 there are tables that are both L and L+1 distant from a current table, e.g., if the current table is index I, then there are earlier tables at I−L, I−L−1 and later tables at I+L and I+L+1. If the delay was simply an integer L symbols, then only the tables at I−L and I+L would be interacting with table I. Likewise, if the delay was an integral number of L+1 symbols, then only the tables at I−L−1 and I+L+1 would interact with table I. When the delay is a non-integer between L and L+1 symbols however, both the tables at I−L−1 and I+L+1 and the tables at I−L and I+L are caused to interact with the table at I.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

The invention claimed is:

1. A receiver for processing a signal modulated with data symbols and received via a plurality of paths having a relative delay therebetween, the receiver comprising:
   a sampler configured to sample said signal to obtain at least one sample per data symbol time interval;
   a channel estimator configured to determine a set of complex channel coefficients that characterize said delayed paths;
   a metric computer configured to compute an estimate of a current symbol and an associated metric, wherein said current symbol estimate and said associated metric are based on signal samples from said sampler, said channel coefficients from said channel estimator, estimates of previously estimated symbols and associated metrics, and hypotheses of not yet estimated symbols, and wherein the metric computer is further configured to store said current symbol estimates and said associated metrics associated with combinations of said hypothesized symbols in a metric table for said current symbol; and
   a soft symbol value generator configured to generate a soft symbol value for a symbol based on said signal samples from said sampler, said channel coefficients from said channel estimator and estimates of symbols computed by said metric computer.

2. The receiver of claim 1, wherein at least one of said estimates of previously estimated symbols corresponds to a previously estimated symbol stored in its associated metric table having a lowest metric of all metrics with the same value of hypothesized symbols as symbols currently being hypothesized by said metric computer.

3. The receiver of claim 1, wherein said current symbol, at least one previously estimated symbol and at least one hypothesized symbol are used to specify hypothesized values of those symbols in a previously computed metric table in order to obtain estimates of other previously estimated symbols needed to compute said metric table for the current symbol.

4. The receiver of claim 1, further comprising a decision refinement processor, which substitutes symbol estimates made subsequently by said metric computer for previously hypothesized symbols in order to select a reduced set of entries in a previously computed metric table.

5. The receiver of claim 4, wherein when selecting said reduced number of entries in said previously computed metric table, if said decision refinement processor determines a non-selected table entry was used as an estimate of an already estimated symbol by said metric computer in computing an entry in a later metric table said metric computer re-computes said later metric table entry if said already estimated symbol would now have a different value than the value used previously.

6. The receiver of claim 1, further comprising an error correction decoder for decoding said soft symbol values to produce error corrected symbols.

7. The receiver of claim 6, further comprising an error detection decoder to determine if said error correction decoder was successful in correcting symbol errors.

8. The receiver of claim 7, wherein when said error detection decoder determines that said error correction decoder did not successfully correct all symbol errors, the best estimates of error corrected symbols from said error correction decoder are substituted for symbols estimated by said metric computer and used by said soft symbol generator to generate new soft symbol values for iteratively repeating said error correction decoding and error detection decoding.

9. The receiver of claim 1, wherein said receiver is configured for filtering, amplifying, and analog-to-digital converting said summed signal to obtain said at least one sample per data symbol time interval.

10. The receiver of claim 1, wherein said metric computer stores an index for each row in said metric table indicating a location of one or more values stored in said row.

11. The receiver of claim 10, wherein said index is used for traceback in determining the final output of the receiver.

12. The receiver of claim 10, wherein said associated metric is a sum of the squares of residual errors associated with said current symbol estimate.

13. A method for processing a signal modulated with data symbols and received through a plurality of paths, the method comprising:
   sampling said signal to obtain at least one sample per data symbol time interval;
   determining a set of complex channel coefficients that characterize said delayed paths;
   computing an estimate of a current symbol and an associated metric, wherein said current symbol estimate and said associated metric are based on said sampling of said signal, said determining of said set of complex channel coefficients, estimates of previously estimated symbols and associated metrics, and hypotheses of not yet estimated symbols;
   storing said current computed symbol estimates and said associated metrics for combinations of said hypothesized symbols in a metric table for said current symbol; and
   generating a soft symbol value for a symbol based on said sampled signal, said determined set of channel coefficients and computed estimates of symbols.

14. The method of claim 13, wherein at least one of said estimates of previously estimated symbols corresponds to a previously estimated symbol stored in its associated metric table having a lowest metric of all metrics with the same value of hypothesized symbols as symbols currently being hypothesized by said metric computer.

15. The method of claim 13, further comprising specifying hypothesized values of symbols in a previously computed metric table in order to obtain estimates of other previously estimated symbols needed to compute said metric table for said current symbol, wherein said current symbol, at least one previously estimated symbol, and at least one hypothesized symbol are used for said specifying hypothesized values of symbols.

16. The method of claim 13, further comprising substituting symbol estimates subsequently computed for previously hypothesized symbols in order to select a reduced set of entries in a previously computed metric table.

17. The method of claim 13, further comprising:
   determining if a non-selected table entry was used as an estimate of an already estimated symbol in computing an entry in a later metric table; and
   re-computing said later metric table entry if said already estimated symbol would now have a different value than the value used previously.

18. The method of claim 13, further comprising decoding said soft symbol values to produce error corrected symbols.

19. The method of claim 18, further comprising determining if said error correction decoding was successful in correcting symbol errors.

20. The method of claim 19, further comprising substituting the best estimates of error corrected symbols for symbols estimated by computing an estimate to generate new soft symbol values for iteratively repeating said error correction decoding and error detection decoding when said error detection decoding determines that said error correction decoding did not successfully correct all symbol errors.

21. The method of claim 13, wherein sampling includes filtering, amplifying, and analog-to-digital converting said summed signal to obtain at least one sample per data symbol time interval.

22. The method of claim 13, further comprising storing an index for each row in said metric table indicating the location of one or more values stored in said row.

23. The method of claim 22, further comprising using said index for traceback in determining the final output of the receiver.

24. A non-transitory computer-readable medium having stored thereon instructions for decoding a signal modulated with data symbols and received via delayed paths, said instructions comprising code for performing the steps of:
   sampling said signal to obtain at least one sample per data symbol time interval;
   determining a set of complex channel coefficients that characterize said delayed paths;
   hypothesizing not yet estimated symbols;
   computing an estimate of a current symbol and an associated metric, wherein said current symbol estimate and said associated metric are based on said sampling, said determining of said set of complex channel coefficients, said hypothesizing of not yet estimated symbols, estimates of previously estimated symbols and associated metrics;
   storing said current computed symbol estimates and said associated metrics with combinations of said hypothesized symbols in a metric table for said current symbol; and
   generating a soft symbol value for a symbol based on said sampled signal, said determined set of channel coefficients, and computed estimates of symbols.

25. The non-transitory computer-readable medium of claim 24, wherein at least one of said
   estimates of previously estimated symbols corresponds to a previously estimated symbol stored in its associated metric table having the lowest metric of all metrics with the same value of hypothesized symbols as symbols currently being hypothesized by said metric computer.

26. A method for performing equalization in a diversity receiver comprising:
   receiving an information signal along at least two different paths, one path having a time delay L relative to the other path;
   wherein said time delay L is a non-integer number of symbol periods, and a value of L is greater than 25 symbol periods; and
   generating a soft symbol value for a symbol in said information signal based on samples from said information signal, channel coefficients associated with said information signal and stored estimates associated with other symbols in said information signal,
   wherein a computational complexity associated with said step of generating is on the order of M, where M is a size of a symbol alphabet associated with said information signal.

27. The method of claim 26, wherein a delay profile associated with said time delay L is uneven.

28. The method of claim 27, wherein said uneven delay profile includes a first time dispersion value of a plurality of microseconds associated with a symbol in one of said at least two different paths and a second time dispersion value of a plurality of microseconds associated with a corresponding symbol in the other of said at least two different paths.

* * * * *

UNITED STATES PATENT AND TRADEMARK OFFICE
CERTIFICATE OF CORRECTION

PATENT NO. : 8,369,459 B2  
APPLICATION NO. : 12/415094  
DATED : February 5, 2013  
INVENTOR(S) : Dent Page 1 of 1

It is certified that error appears in the above-identified patent and that said Letters Patent is hereby corrected as shown below:

In the Specification

In Column 13, Line 22, delete "conduction" and insert -- conjunction --, therefor.

In Columns 13 & 14, in Equation (4), Line 1, delete "+C1.h(-T+1).S(i)" and insert -- +C1.h(-T+t).S(i) --, therefor.

In Columns 13 & 14, in Equation (4), Line 4, delete "C2.h(T-1).S(i-1)" and insert -- C2.h(T-t).S(i-1) --, therefor.

In Columns 13 & 14, in Equation (4), Line 6, delete "C2.h(T-1).S(i)" and insert -- C2.h(T-t).S(i) --, therefor.

Signed and Sealed this  
Fourth Day of June, 2013

Teresa Stanek Rea  
*Acting Director of the United States Patent and Trademark Office*